(12) United States Patent
Freer

(10) Patent No.: US 12,139,265 B2
(45) Date of Patent: *Nov. 12, 2024

(54) AIRCRAFT PROPULSION SYSTEM WITH INTERMITTENT COMBUSTION ENGINE AND ELECTRIC TRANSMISSION SYSTEM AND METHOD FOR OPERATING THE SAME

(71) Applicant: Pratt & Whitney Canada Corp., Longueuil (CA)

(72) Inventor: Richard Freer, Saint-Basile-le-Grand (CA)

(73) Assignee: Pratt & Whitney Canada Corp., Longueuil (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/367,657

(22) Filed: Sep. 13, 2023

(65) Prior Publication Data
US 2023/0415905 A1      Dec. 28, 2023

Related U.S. Application Data

(63) Continuation of application No. 17/845,576, filed on Jun. 21, 2022, now Pat. No. 11,827,370.

(51) Int. Cl.
| | |
|---|---|
| F02C 5/06 | (2006.01) |
| B64D 27/08 | (2006.01) |
| B64D 27/20 | (2006.01) |
| B64D 27/24 | (2006.01) |
| B64D 33/08 | (2006.01) |
| B64D 27/02 | (2006.01) |

(52) U.S. Cl.
CPC ............. *B64D 27/24* (2013.01); *B64D 27/08* (2013.01); *B64D 27/20* (2013.01); *B64D 33/08* (2013.01); *F02C 5/06* (2013.01); *B64D 27/026* (2024.01)

(58) Field of Classification Search
CPC .. F02C 7/141; F02C 7/143; F02C 7/32; F02C 7/36; F02C 5/06
See application file for complete search history.

(56) References Cited

U.S. PATENT DOCUMENTS

| | | | | |
|---|---|---|---|---|
| 2,465,099 A | * | 3/1949 | Johnson | .................. F02C 3/055 60/262 |
| 2,478,206 A | * | 8/1949 | Redding | ................. F02K 3/062 60/268 |

(Continued)

*Primary Examiner* — Thuyhang N Nguyen
(74) *Attorney, Agent, or Firm* — Getz Balich LLC

(57) ABSTRACT

An aircraft propulsion system for an aircraft having a nacelle that includes a pylon structure is provided. The system includes compressor and turbine sections, an IC engine, a fan, and an IC engine cooling system. The compressor section is powered by a first electric motor. The turbine section is configured to power a first electric generator configured to produce electrical power. The first fan is rotationally driven by a second electric motor. The fan has a hub and a plurality of fan blades extending radially outward from the hub. The hub is disposed in the pylon interior region and the fan blades are configured to extend outside of the pylon structure. The fan is positioned downstream of the compressor section. The IC engine cooling system has a heat exchanger and a pump configured to provide coolant communication between the IC engine and the heat exchanger.

18 Claims, 7 Drawing Sheets

(56) References Cited

U.S. PATENT DOCUMENTS

| | | | |
|---|---|---|---|
| 4,605,185 A | 8/1986 | Reyes | |
| 9,623,978 B2 | 4/2017 | Anton | |
| 10,450,952 B2 * | 10/2019 | Julien | F02K 3/06 |
| 11,292,604 B2 | 4/2022 | Thomassin | |
| 11,365,706 B2 * | 6/2022 | Hodges | B64D 27/16 |
| 11,827,370 B1 * | 11/2023 | Freer | B64D 33/08 |
| 2004/0255590 A1 * | 12/2004 | Rago | F02C 7/36 60/793 |
| 2015/0260127 A1 * | 9/2015 | Wennerstrom | F02K 3/115 60/226.1 |
| 2021/0054788 A1 * | 2/2021 | Kupratis | F02C 3/113 |

* cited by examiner

AIRCRAFT PROPULSION SYSTEM WITH INTERMITTENT COMBUSTION ENGINE AND ELECTRIC TRANSMISSION SYSTEM AND METHOD FOR OPERATING THE SAME

This application is a continuation of U.S. patent application Ser. No. 17/845,576 filed Jun. 21, 2022, which is hereby incorporated herein by reference in its entirety.

BACKGROUND OF THE INVENTION

1. Technical Field

The present disclosure relates to hybrid-electric aircraft propulsion systems and methods for operating the same.

2. Background Information

An aircraft such as a business jet may fly at relatively high altitudes to reduce aircraft drag and at relatively high speeds to decrease flight time. Therefore, engine power and engine efficiency at high altitudes is a relatively important factor when selecting a propulsion system engine for a typical business jet.

A typical business jet may include at least one small gas turbine engine for propulsion. A small gas turbine engine is typically lighter than other types of internal combustion engines; e.g., a reciprocating piston engine. However, a small gas turbine engine is relatively fuel inefficient when compared to other types of internal combustion engines. A gas turbine engine may also be subject to power loss as the altitude of the aircraft powered by the gas turbine engine increases.

Intermittent internal combustion (IC) engines such as a rotary engine (e.g., a Wankel type rotary engine), a reciprocating piston engine, and other constant volume internal combustion engines have been used or proposed as an alternative power source for aircraft. There are benefits and disadvantages relating to both intermittent IC engines and small gas turbine engines. On the one hand, intermittent IC engines are often less expensive than a typical gas turbine engine and can be relatively fuel efficient when compared to a small gas turbine engine. On the other hand, the fuel efficiency of intermittent IC engines is often offset by the intermittent IC engine having a greater weight than a small gas turbine engine. Hence, to realize the fuel efficiency of the intermittent IC engine and to show benefits in terms of payload versus range or lower take-off weight, it is often necessary for an aircraft powered by an intermittent IC engine powered aircraft to fly for a relatively long mission duration; i.e., over a long mission duration the weight of fuel saved by the more efficient intermittent IC engine can be greater than the increase in powerplant weight associated with the more efficient intermittent IC engine. This effect is more noticeable for high-altitude aircraft because gas turbine engines lose power as altitude increases, which means that for a specified higher-altitude cruise power the gas turbine would have to be made larger and heavier, and the weight advantage of the turbine is less significant.

However, intermittent IC engines may be difficult to implement in a high altitude, high speed aircraft with podded engines, such as a business jet. For example, a turbo-compounded or turbocharged rotary engine typically has relatively large volume coolers and relatively large frontal areas as compared to a small gas turbine engine. The relatively large volume coolers and the relatively large frontal areas of the engines are difficult to fit in podded engine nacelles and can produce considerable drag in a highspeed aircraft applications. In view thereof, intermittent IC engines historically have been used for powering low altitude, lower speed aircraft such as propeller planes and helicopters.

Another factor to be considered is that fan thrust is typically controlled by varying fan speed. Thus, a propulsion system engine for a business jet should have a relatively large operating speed range, or operating band, to accommodate both low thrust operation and high thrust operation when, for example, at high-speed, high-altitude cruise. A typical intermittent IC engine, however, has a relatively narrow operating band as compared to a gas turbine engine.

What is needed is a propulsion system that provides an acceptable operating band that accommodates both low thrust operation and high thrust operation, one that provides improved fuel economy, and one that does not significantly increase the frontal area of the aircraft or the propulsion nacelles of the aircraft.

SUMMARY

According to an aspect of the present disclosure, an aircraft propulsion system for an aircraft is provided. The aircraft includes a nacelle and a fuselage. The nacelle has a gas flow path defined by an axially extending first airflow confining structure and an axially extending second airflow confining structure. The first airflow confining structure defines a nacelle interior region and the second airflow confining structure is disposed radially outside of the first airflow confining structure. The system includes a compressor section, an intermittent internal combustion (IC) engine, a turbine section, at least one fan, and an IC cooling system. The compressor section is powered by a first electric motor. The compressor section is configured to be disposed in the nacelle interior region and to receive air entering the nacelle, and is configured to selectively produce a flow of compressor air at an air pressure greater than an ambient air pressure. The intermittent IC engine is configured to selectively intake the flow of compressor air during operation and produce an exhaust gas flow during operation. The turbine section is in communication with and configured to power a first electric generator configured to produce electrical power. The turbine section is powered by the exhaust gas flow. The at least one fan is rotationally driven by a second electric motor about a first rotational axis. The fan has a hub centered on the rotational axis and a plurality of fan blades extending radially outward from the hub. The hub is configured to be disposed in the nacelle interior region and the plurality of first fan blades are configured to extend into the gas flow path. The IC engine cooling system has at least one heat exchanger, a volume of coolant, coolant piping, and a pump configured to provide coolant communication between the intermittent IC engine and the at least one heat exchanger. The at least one heat exchanger is disposed within the gas flow path of the nacelle. Another optional heat exchanger, or intercooler, may be added between the compressor and the intermittent IC engine, to selectively cool the compressed air before it is delivered to the intermittent IC engine. This intercooler provides a means for heat to be transferred between the compressed air and the ambient air and may be located in such a way to make use of the ambient air flow between the nacelle and the fuselage.

In any of the aspects or embodiments described above and herein, the first electric motor may be configured to have an adjustable rotational speed and/or an adjustable torque setting, and a rotational speed of the compressor section may be controllable by adjusting at least one of the rotational speed of the first electric motor or the torque setting of the first electric motor.

In any of the aspects or embodiments described above and herein, the system may further include a second fan rotationally driven by a third electric motor about a second rotational axis. The second fan has a second hub centered on the second rotational axis and a plurality of second fan blades extending radially outward from the second hub. The second hub is configured to be disposed in the nacelle interior region and the plurality of second fan blades are configured to extend into the gas flow path.

In any of the aspects or embodiments described above and herein, the second electric motor may be controllable to vary a rotational speed of the first fan and the third electric motor may be controllable to vary a rotational speed of the second fan.

In any of the aspects or embodiments described above and herein, the electrical power produced by the first electric generator may be used to power at least one of the first electric motor, the second electric motor, or the third electric motor, or to recharge an energy storage device such as a battery, or to power other aircraft electrical loads.

In any of the aspects or embodiments described above and herein, the intermittent IC engine may be configured to be disposed in the fuselage of the aircraft, and the coolant piping of the IC engine cooling system may be configured to provide fluid communication of the coolant between the intermittent IC engine and the at least one heat exchanger.

In any of the aspects or embodiments described above and herein, the system may further include at least one second electric generator configured to be driven by the intermittent IC engine and at least one battery configured to store electrical energy. The electrical power produced by the at least one second electric generator may be used to power at least one of the first electric motor, the second electric motor, or the third electric motor, or to recharge an energy storage device such as a battery, or to power other aircraft electrical loads.

In any of the aspects or embodiments described above and herein, the at least one heat exchanger of the IC engine cooling system may be configured to be disposed in the gas flow path adjacent the second airflow confining structure, and may be configured to extend a circumferential distance within the gas flow path.

In any of the aspects or embodiments described above and herein, the at least one heat exchanger of the IC engine cooling system may include a first heat exchanger and a second heat exchanger, and the first heat exchanger and the second heat exchanger may be axially separated from one another.

According to another aspect of the present disclosure, an aircraft is provided that includes a fuselage, at least one nacelle, and at least one propulsion system. The at least one nacelle has a gas flow path defined by an axially extending first airflow confining structure and an axially extending second airflow confining structure. The first airflow confining structure defines a nacelle interior region and the second airflow confining structure is disposed radially outside of the first airflow confining structure. The at least one propulsion system has a compressor section, an intermittent IC engine, a turbine section, a first fan, and an IC engine cooling system. The compressor section is powered by a first electric motor. The compressor section is disposed in the nacelle interior region and is configured to receive air entering the at least one nacelle, and is configured to selectively produce a flow of compressor air at an air pressure greater than an ambient air pressure. A radial compressor and scroll may be used to simultaneously increase the pressure of the ambient air and change its direction such that the air leaves the compressor in a duct with an axis that is substantially perpendicular to the compressor's axis of rotation. The intermittent IC engine is configured to selectively intake the flow of compressor air during operation and produce an exhaust gas flow during operation. The intermittent IC engine is disposed in the fuselage. The turbine section is in communication with and configured to power a first electric generator configured to produce electrical power. The turbine section is powered by the exhaust gas flow. The exhaust ducts can be insulated to reduce heating of nearby structure and equipment. The first fan is rotationally driven by a second electric motor about a first rotational axis. The first fan has a first hub centered on the first rotational axis and a plurality of first fan blades extending radially outward from the first hub. The first hub is disposed in the nacelle interior region of the at least one nacelle, and the plurality of first fan blades extend into the gas flow path of the at least one nacelle. The IC engine cooling system has at least one heat exchanger, a volume of coolant, coolant piping, and a pump configured to provide coolant communication between the intermittent IC engine and the at least one heat exchanger. The at least one heat exchanger is disposed within the gas flow path of the at least one nacelle.

In any of the aspects or embodiments described above and herein, the at least one heat exchanger of the IC engine cooling system may include a first heat exchanger and a second heat exchanger each configured to be disposed in the gas flow path adjacent the second airflow confining structure, and each may be configured to extend a circumferential distance within the gas flow path.

In any of the aspects or embodiments described above and herein, the turbine section and the first electric generator of the at least one propulsion system may be disposed in the nacelle interior region, and the nacelle may be configured to permit an amount of air to exit the gas flow path and enter the nacelle interior region. In some embodiments, the aforesaid air exited from the gas flow path may subsequently exit around the muffler and exhaust section such that a flow of air is created. This flow of air can be used to help reduce the temperature of the airflow containing structure or of other structures or devices that could be heated, either directly or indirectly, by the turbine and exhaust sections.

In any of the aspects or embodiments described above and herein, the at least one nacelle may include a first nacelle and a second nacelle, and the at least one propulsion system may include a first propulsion system having a first compressor section and a second propulsion system having a second compressor section, and the turbine section and first electric generator of the at least one propulsion system may be disposed in the fuselage, and the intermittent IC engine may be configured to selectively intake a first flow of compressor air from the first compressor section during operation and to selectively intake a second flow of compressor air from the second compressor section during operation.

According to an aspect of the present disclosure, a method of powering an aircraft having a fuselage and at least one nacelle is provided. The nacelle has an annular gas flow path defined by an axially extending first airflow confining structure and an axially extending second airflow confining structure. The first airflow confining structure defines a nacelle interior region and the second airflow confining structure is disposed radially outside of the first airflow confining structure. The method includes: a) driving a compressor section using a first electric motor to selectively produce a flow of compressor air at an air pressure greater than an ambient air pressure, the compressor section disposed radially inside of the first airflow confining structure and disposed to receive air entering the at least one nacelle; b) operating an intermittent IC engine using the flow of compressor air to drive at least one first electric generator to produce electrical power and to produce an exhaust gas flow during operation, wherein the intermittent IC engine and the at least one electric generator are disposed in the fuselage; c) operating a turbine section to drive a second electric generator to produce electrical power, the turbine section powered using the exhaust gas flow; d) rotationally driving at least one fan about a rotational axis using a second electric motor powered by electrical power produced by the at least one first electrical generator, or the second electrical generator, or both, to force ambient air through the gas flow path, the fan having a first hub centered on the rotational axis and a plurality of fan blades extending radially outward from the hub, wherein the hub is disposed in the nacelle interior region, and the plurality of first fan blades extend into the gas flow path of the at least one nacelle; and e) pumping a volume of coolant through at least one IC engine cooling system coolant circuit having at least one heat exchanger, coolant piping, and a pump, the IC engine cooling system configured to provide coolant communication between the intermittent IC engine and the at least one heat exchanger, the at least one heat exchanger disposed within the gas flow path of the at least one nacelle. In some embodiments, the cooling system (e.g., cooling circuits) may also provide cooling to additional components such as a generator, etc.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
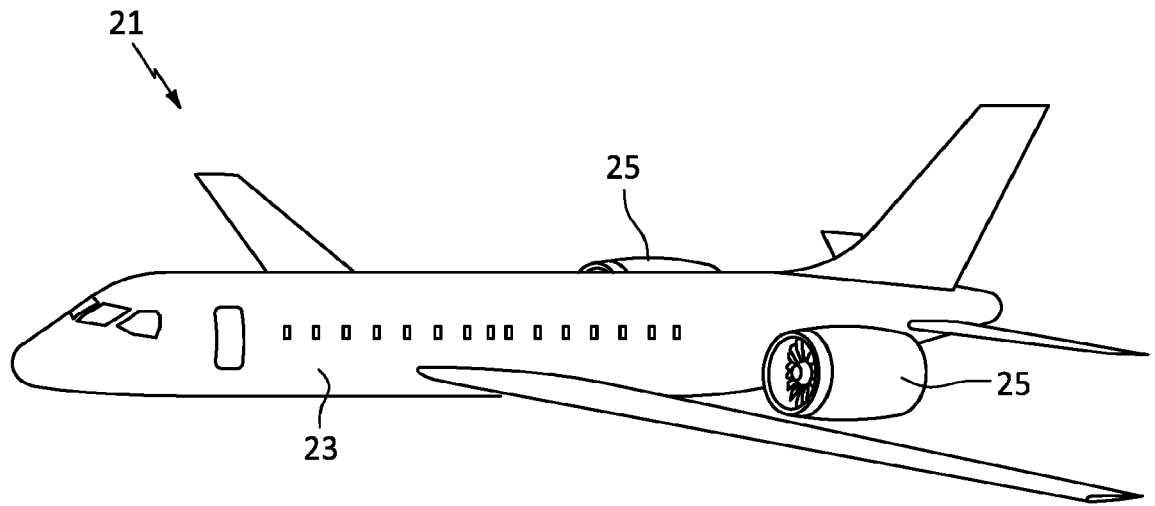
FIG. 1 is a diagrammatic perspective view of an aircraft.
Figure 1A:
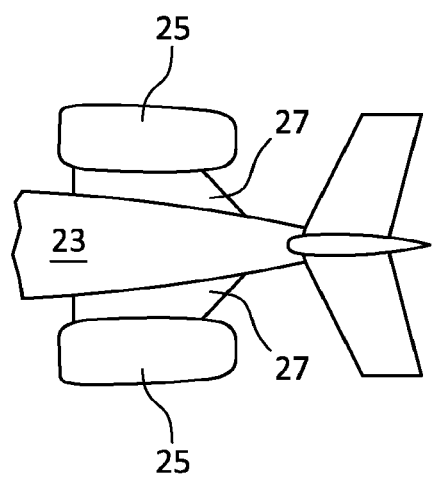
FIG. 1A is a diagrammatic partial top view of an aircraft like that shown in FIG. 1.

Referring to the FIGS. 1-5, aspects of the present disclosure include an aircraft propulsion system 20, an aircraft 21 that utilizes the present disclosure system 20, and a method for operating the same. The aircraft 21 includes a fuselage 23 and at least one propulsion nacelle 25. As described herein, embodiments of the aircraft propulsion system 20 include components such as an intermittent IC engine, a fan, a turbine section, a compressor section, and an electric transmission system. The electric transmission system may include one or more electric motors, electric generators, and batteries. In some embodiments, the system 20 may include a system controller 32 in communication with other components within the system 20. The present disclosure aircraft propulsion system 20 contemplates several different configurations that may include one or more than one of each of the aforesaid components.

The intermittent IC engine 22 (e.g., an internal combustion engine characterized by periodic ignition of fuel and air) may be a Wankel type rotary engine, or a reciprocating piston engine, or other type of constant volume IC engine or rotating detonation engine that powers a rotating output shaft. The present disclosure is not limited to any particular type of intermittent IC engine 22. The intermittent IC engine 22 may be configured to combust a variety of different fuels (e.g., hydrocarbon based fuel, hydrogen, or the like) and is not limited to any particular type of fuel. During operation, the intermittent IC engine 22 intakes air and fuel and combusts the mixture of air and fuel to produce power. The combustion of the air/fuel mixture produces exhaust gases. The intermittent IC engine 22 may be mounted within the fuselage 23 of the aircraft 21; e.g., in the aft fuselage 23. The present disclosure is not limited to any particular mounting configuration of the intermittent IC engine 22.

The intermittent IC engine 22 utilizes a cooling system 38 that includes at least one heat exchanger 40A, 40B, coolant piping 42, and a coolant fluid. The coolant piping 42 (e.g., including fluid piping, valves, sensors, etc.) permits fluid communication of coolant between the intermittent IC engine 22 and the heat exchanger 40A, 40B. In some embodiments, the cooling system 38 may be configured to have a plurality of cooling circuits; e.g., coolant piping 42A and heat exchanger 40A may be within a first cooling circuit and coolant piping 42B and heat exchanger 40B may be within a second cooling circuit. An example of a heat exchanger 40A, 40B that may be used is a crossflow type heat exchanger having passages (e.g., tubes) for containing a flow of coolant and openings (typically orthogonal to the coolant direction) through which an airflow may traverse. The air passing through, or otherwise in contact with, the heat exchanger 40A, 40B is at a lower temperature than the coolant passing through the same heat exchanger 40A, 40B. Thermal energy from the coolant is transferred to the air passing through/contacting the heat exchanger 40A, 40B during operation of the system 20. In other cooling system embodiments, a heat exchanger may be configured as a two fluid heat exchanger that transfers thermal energy from the coolant to a second fluid (e.g., an oil such as a lubricating oil of the intermittent IC engine, or the like). The present disclosure is not limited to any particular type of cooling system, and may use combinations of different types of heat exchangers and different fluids passing through a respective heat exchanger. A pump 44 is typically used to pump the coolant through portions of the intermittent IC engine 22, the coolant piping 42, and through the heat exchanger 40A, 40B to transfer thermal energy away from the intermittent IC engine 22. The heat exchanger 40A, 40B may be mounted in a variety of different locations on the aircraft 21. The coolant may be glycol, or a glycol/water mixture, or other known coolant. In some embodiments, the system 20 may include one or more heat exchangers (sometimes referred to as "intercoolers") in the air flow path between the compressor and the intermittent IC engine, to selectively cool the compressed air before it is delivered to the intermittent IC engine. This intercooler provides a means for heat to be transferred between the compressed air and the ambient air and may be located in such a way to make use of the ambient air flow between the nacelle 25 and the fuselage 23.

The turbine section 26 may include either a radial turbine (e.g. in which the flow of the working fluid is radial to the shaft) or an axial-type turbine (e.g., a rotor having a hub with a plurality of turbine blades extending radially out from the hub), or a combination of both types of turbine such as a radial turbine followed by an axial turbine. In some embodiments, the turbine section 26 may include a scroll type inlet. In some embodiments, a turbine section may be configured to accept exhaust gases along a first axis (e.g., a Y-axis) and to exit the exhaust gases along a second axis (e.g., an X-axis) that is substantially orthogonal to the first axis. The turbine section 26 may be a single stage turbine or may have a plurality of turbine stages.

The compressor section 28 may include a radial compressor or an axial-type compressor (e.g., a rotor having a hub with a plurality of compressor blades extending radially out from the hub) and may include a scroll type outlet. In some embodiments, a compressor section may be configured to accept intake air along a first axis (e.g., a Y-axis) and to exhaust compressed air along a second axis (e.g., an X-axis) that is substantially orthogonal to the first axis. The compressor section 28 may be a single stage compressor or may have a plurality of compressor stages. Controllable, variable geometry flow structures such as movable inlet vanes or valves may also be used in the compressor section 28, for example upstream of an axial compressor stage.

Figure 2:
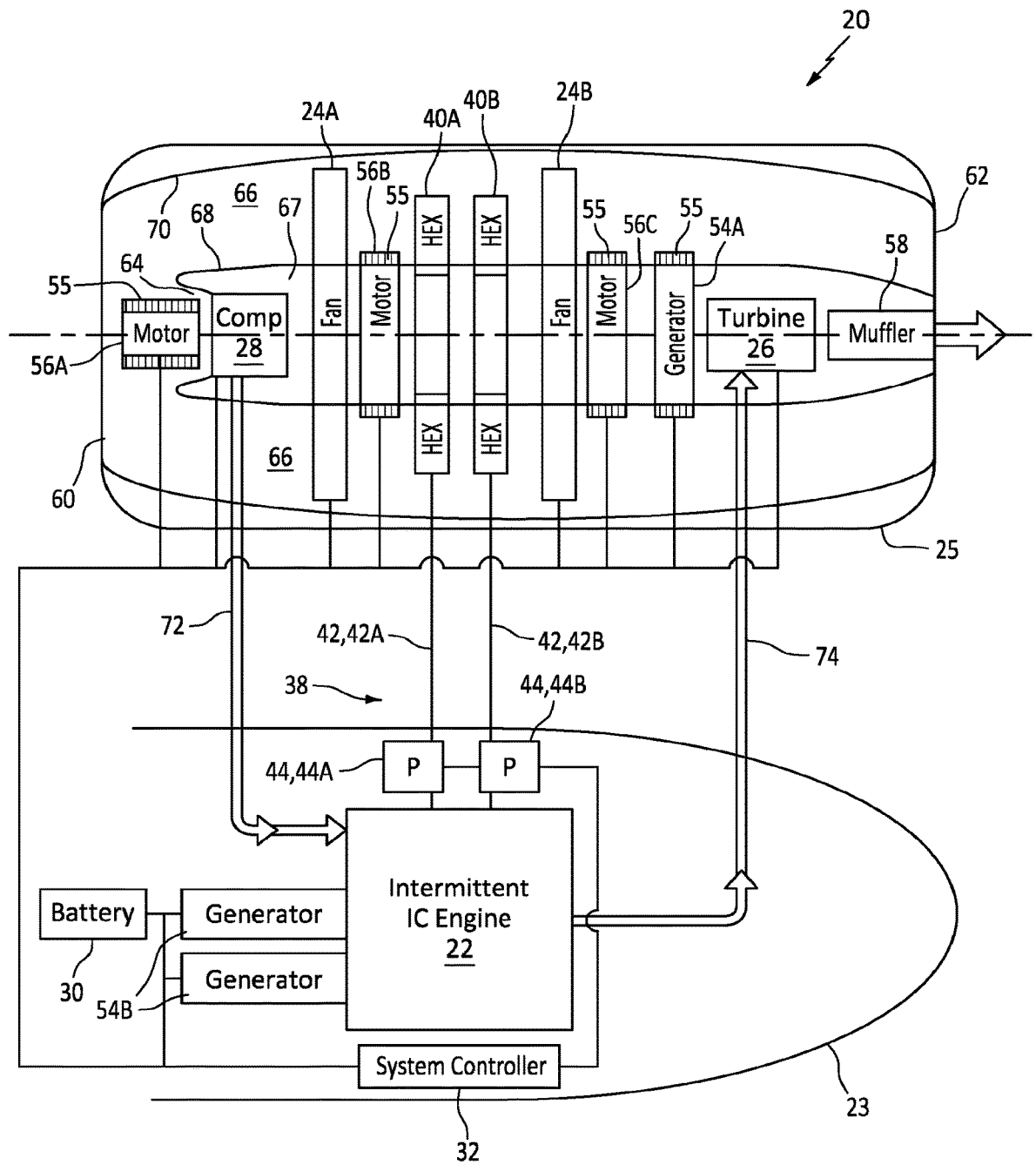
FIG. 2 is a diagrammatic illustration of a hybrid aircraft propulsion system according to an embodiment of the present disclosure.
Figure 2A:
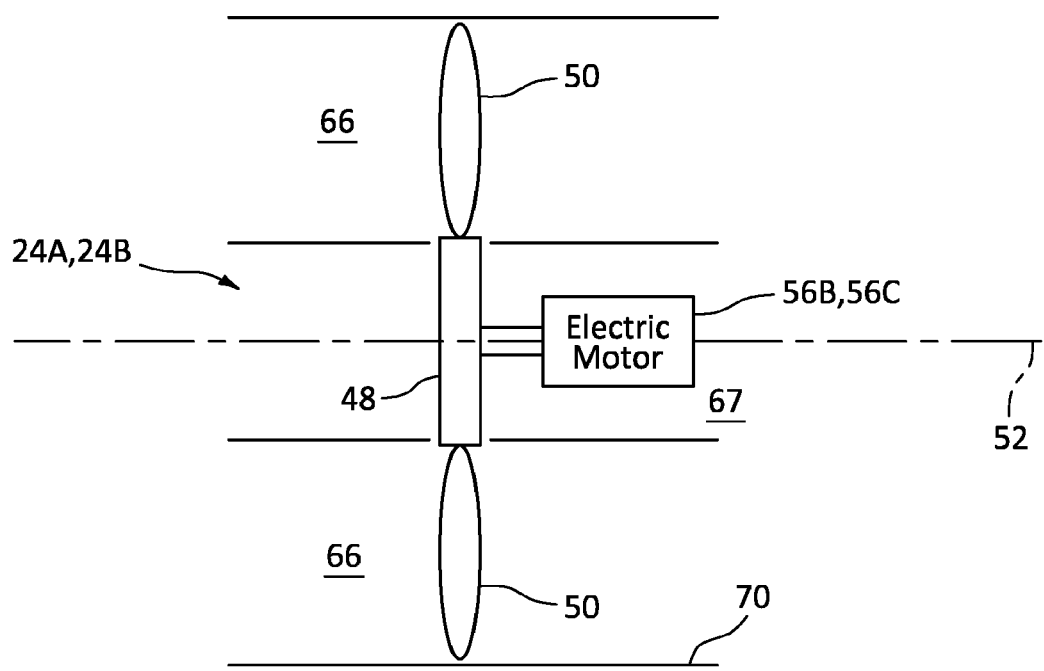
FIG. 2A is an expanded diagrammatic illustration of a fan and electric motor shown in FIG. 2.

Referring to FIGS. 2 and 2A, a fan 24A, 24B utilized in the present system 20 includes a hub 48 and a plurality of fan blades 50 extending out from the hub 48. The fan 24A, 24B is configured for rotation about a rotational axis 52. In some embodiments, the fan 24A, 24B may be rotationally driven by a fan input shaft (or other mechanical structure) in communication with the hub 48. The fan blades 50 are spaced apart from one another around the circumference of the hub 48. The fan blades 50 may be mechanically attached to the hub 48, or the hub 48 and fan blades 50 may be a unitary structure. The fan 24A, 24B configuration (e.g., number, size, geometry, etc. of the fan blades) may be varied to satisfy the thrust requirements of the aircraft 21 application. The present disclosure is not limited to any particular fan 24A, 24B configuration. Rotation of the fan 24A, 24B about the rotational axis 52 in a predetermined direction (e.g., either clockwise or counterclockwise) and within a predetermined rotational velocity range produces thrust that can be used to translationally power the aircraft 21. The system 20 examples shown in the Figures include a pair of fans 24A, 24B. Present disclosure system embodiments may include a single fan, two fans, or more than two fans. In some embodiments, a fan may include a single fan stage or more than one fan stage. In some embodiments, the present disclosure may include airflow directing structures (e.g., guide vanes—not shown) for desirably directing airflow into a fan (e.g., disposed upstream of the fan) and/or controlling airflow exiting a fan (e.g., disposed downstream of a fan). In those embodiments having a plurality of fans, each fan may have a configuration (e.g., number, size, geometry, etc. of the fan blades) that is different from another of the fans. In some embodiments, variable pitch fans may be used.

An electric generator(s) 54A, 54B utilized in the present system 20 may be configured to be rotationally driven and to produce electrical power. An electric generator employed within the system 20 may be a single generator system with a single three-phase winding set or it may contain a plurality of independent three-phase winding sets. An electric generator employed within the system 20 may incorporate controls (e.g., hardware, or control logic, or any combination thereof) to permit management of the electrical power produced by the generator to the system. Alternatively, such power management controls may be disposed separately from the generator. An electric generator(s) 54A, 54B may be configured to produce three-phase AC electric power for systems in which electric power is distributed via a three-phase distribution network. Within the system 20, the generator system may be configured to generate DC current using full-wave diode rectifier(s). The system embodiments shown in Figures include one or more electric generators. The present disclosure system is not limited to any particular number of generators. As described herein, in some embodiments an electric generator 54A, 54B within the present system 20 may also be controlled to operate an as electric motor for part of the mission, such as when starting the Intermittent IC engine.

Electric motors 56A, 56B, 56C utilized within the present system 20 may be configured to be rotationally driven by electrical power produced directly or indirectly by the electric generator(s) 54A, 54B and/or by a battery 30.

The one or more batteries 30 are configured to store electrical energy produced by an electric generator 54A, 54B and to selectively provide electrical energy for the system 20; e.g., to drive an electrical motor(s) 56A, 56B, 56C.

Embodiments of the present disclosure aircraft propulsion system 20 may include a system controller 32 in communication with various system components, including electric motors 56A, 56B, 56C, the compressor section 28, fans 24A, 24B, the IC engine cooling system 38, electric generators 54A, 54B, the turbine section 26, the battery(ies) 30, the intermittent IC engine 22, and various other components (e.g., valving, sensors, and the like), to control and or receive signals therefrom to perform the functions described herein. The system controller 32 may assume a variety of different configurations and may be disposed in various places within the aircraft. The system controller 32 may include any type of computing device, computational circuit, processor(s), CPU, computer, or the like capable of executing a series of instructions that are stored in memory. In some embodiments, the system controller 32 may include a plurality of controllers (e.g., each including a computing device or the like) each associated with one or more components within the system 20 for control thereof. In some embodiments, those respective controllers may communicate with one another and thereby may collectively form the system controller 32, and/or subordinate controllers may communicate with a dominant controller. The present disclosure is not limited to any particular control architecture. The instructions executable by a controller may include an operating system, and/or executable software modules such as program files, system data, buffers, drivers, utilities, and the like. The executable instructions may apply to any functionality described herein to enable the system 20 to accomplish the same algorithmically and/or coordination of system components. The system controller 32 may include a single memory device or a plurality of memory devices and the present disclosure is not limited to any particular type of memory device.

As stated above, the present disclosure aircraft propulsion system 20 contemplates several different configurations that may include one or more than one of the aforesaid components. Non-limiting examples of those configurations are provided below to illustrate the utility of the present disclosure.

Referring to FIG. 2, an exemplary embodiment of a present disclosure aircraft propulsion system 20 is diagrammatically shown. This embodiment includes a first electric motor 56A, a compressor section 28, a first fan 24A, a second electric motor 56B, an IC engine cooling system 38, a second fan 24B, a third electric motor 56C, a first electric generator 54A, a turbine section 26, an exhaust gas device 58, a battery 30, a pair of second electric generators 54B, and an intermittent IC engine 22.

In this embodiment, the intermittent IC engine 22, battery (ies) 30, and a pair of second generators 54B are disposed in the aircraft fuselage 23; e.g., in the aft portion of the aircraft fuselage 23. Also in this embodiment, the first electric motor 56A, the compressor section 28, the first fan 24A, the second electric motor 56B, portions of the IC engine cooling system 38, the second fan 24B, the third electric motor 56C, the first electric generator 54A, the turbine section 26, and the exhaust gas device 58 are disposed within a nacelle 25 of the aircraft 21.

The nacelle 25 is diagrammatically shown as having a forward end 60 and an aft end 62 disposed at opposite ends of an axially extending axis. The forward end 60 of the nacelle 25 is disposed to receive air; e.g., as the aircraft 21 travels forward through ambient air, some amount of ambient air will enter the forward end 60 of the nacelle 25. The nacelle 25 includes an axially extending annular gas flow path 66 defined by a first airflow confining structure 68 and a second airflow confining structure 70. The first airflow confining structure 68 defines a nacelle interior region 67. At the forward end of the nacelle 25, the first airflow confining structure 68 is configured to form a compressor inlet duct 64 to direct ambient air into the compressor section 28.

In the embodiment shown in FIG. 2, the first electric motor 56A, the compressor section 28, the first fan 24A, the second electric motor 56B, a portion of the IC engine cooling system 38, the second fan 24B, the third electric motor 56C, the first electric generator 54A, the turbine section 26, and the exhaust gas device 58 are disposed in a serial arrangement within the nacelle 25; i.e., the first electric motor 56A is disposed forward of the compressor section 28, and the compressor section 28 is disposed forward of the first fan 24A, and so on, as shown diagrammatically in FIG. 2. The present disclosure is not limited to the serial arrangement shown in FIG. 2. The components diagrammatically shown in FIG. 2 may be supported by structures such as struts or fixed vanes that are not shown in FIG. 2. Such struts or vanes located in gas flow paths can be shaped to minimize aerodynamic losses and change or straighten the direction of the air flow and/or increase or decrease the speed of the air flow. In the example shown in FIG. 2, the body of first electric motor 56A may be connected to the body of the compressor section 28 via aerodynamic struts or vanes. The rotor of the first electric motor 56A may be connected to a rotor shaft of the compressor section 28 via a shaft or shafts that are supported by bearings. The aforesaid component support/mounting structures or the like may be used in the other system 20 embodiments described herein The first electric motor 56A is in communication with the compressor section 28 (e.g., a compressor rotor and a compressor scroll) and one or more sources of electrical power; e.g., the battery 30, the second generators 54B, and/or the first electric generator 54A. The first electric motor 56A is controllable to drive the compressor section 28. In this embodiment, the compressor section 28 is disposed in the nacelle interior region 67 forward of the first fan 24A. The compressor inlet duct 64 is configured to direct ambient air into the compressor 28. As will be described below, the compressor section 28 selectively processes ambient air to elevate the pressure of the ambient air and selectively provides that elevated pressure air to the intermittent IC engine 22 via compressor air ducting 72. Selective control of the first electric motor 56A and the compressor section 28 may be performed using stored instructions executable by the system controller 32. In alternative embodiments, the first electric motor 56A and the compressor section 28 may be disposed at a position other than in the first airflow containing structure 68 as shown in FIG. 2.

Referring to FIGS. 2 and 2A and as stated above, the fans 24A, 24B within the present disclosure aircraft propulsion system 20 each include a hub 48 and a plurality of fan blades 50 extending out from the hub 48. The hub 48 is disposed in the nacelle interior region 67. Each fan blade 50 extends into the gas flow path 66. The second electric motor 56B is disposed in the nacelle interior region 67.

The first fan 24A and the second electric motor 56B are in communication with one another and are disposed aft of the compressor section 28. The second electric motor 56B is in communication with one or more sources of electrical power; e.g., the battery 30, the second electric generators 54B, and/or the first electric generator 54A. The second electric motor 56B is controllable to drive the first fan 24A at different speed or torque settings; e.g., by stored instructions executable by the system controller 32. In some embodiments, a gearbox may be disposed between the second electric motor 56B and the first fan 24A.

In the system 20 embodiment shown in FIG. 2, a portion of the IC engine cooling system 38 (e.g., a first heat exchanger 40A and a second heat exchanger 40B) is disposed aft of the second electric motor 56B. As will be clear from the present disclosure, portions of the IC engine cooling system 38 may be disposed in a variety of different locations within the aircraft 21 and the exemplary embodiment shown in FIG. 2 is not intended to be limiting. In the system 20 embodiment shown in FIG. 2, the first heat exchanger 40A and the second heat exchanger 40B are disposed in series aft of the second electric motor 56B. At least a portion of the first and/or the second heat exchangers 40A, 40B are disposed within the gas flow path 66; e.g., the first and/or the second heat exchangers 40A, 40B may have an annular configuration wherein the crossflow portion of the heat exchangers 40A, 40B are substantially located within the gas flow path 66. As indicated above, coolant piping 42 and one or more pumps 44 are used to provide coolant communication between the intermittent IC engine 22 and the first and second heat exchangers 40A, 40B. Also as indicated above, the IC engine cooling system 38 may include a plurality of cooling circuits. FIG. 2 diagrammatically illustrates a first cooling circuit that includes the first heat exchanger 40A and a first pump 44A and a second cooling circuit that includes the second heat exchanger 40B and a second pump 44B. The present disclosure is not limited to any particular number of cooling circuits (e.g., can be one or more) and the cooling circuits may use the same coolant, or different coolants.

The second fan 24B and the third electric motor 56C are in communication with one another and in the embodiment shown in FIG. 2 are disposed aft of the first and second heat exchangers 40A, 40B. The third electric motor 56C is in communication with one or more sources of electrical power; e.g., the battery 30, the second electric generators 54B, and/or the first electric generator 54A. The third electric motor 56C is controllable to drive the second fan 24B at different speed or torque settings; e.g., by stored instructions executable by the system controller 32. The third electric motor 56C is disposed in the nacelle interior region 67. In some embodiments, a gearbox may be disposed between the third electric motor 56C and the second fan 24B.

In the embodiment shown in FIG. 2, the first electric generator 54A and the turbine section 26 (e.g., a turbine scroll) are disposed aft of the third electric motor 56C in the nacelle interior region 67. The first electric generator 54A is in communication with the turbine section 26 and one or more electrical components; e.g., the battery 30, the first electric motor 56A, the second electric motor 56B, and/or the third electric motor 56C. The first electric generator 54A is driven by the turbine section 26. As will be described below, the turbine section 26 selectively receives exhaust gases from the intermittent IC engine 22 via exhaust gas ducting 74 and is powered by those exhaust gases. Power produced by the turbine section 26 is used to power the first electric generator 54A; e.g., by a mechanical connection therebetween. Exhaust gases exiting the turbine section 26 are passed to the exhaust gas device 58 (e.g., a muffler, a nozzle, etc.) that may be configured to produce some amount of propulsive force (e.g., thrust). Selective control of the first electric generator 54A and the turbine section 26 may be performed using stored instructions executable by the system controller 32.

As indicated above, the intermittent IC motor, battery(ies) 30, and the second generators 54B may be disposed in the fuselage 23 of the aircraft 21; e.g., in the aft portion of the aircraft fuselage 23. The present disclosure is not limited to disposing the battery(ies) in the fuselage; e.g., a battery may be located in a strut 27. During operation, the intermittent IC engine 22 intakes air and fuel and combusts the mixture to produce power (e.g., via an output shaft). The combustion of the air/fuel mixture produces exhaust gases. The intake air provided to the intermittent IC engine 22 may be ambient air ducted to an intake of the intermittent IC engine 22 during certain portions of an aircraft flight, or the intake air may be ambient air compressed within the compressor section 28 and ducted to the intake of the intermittent IC engine 22 (e.g., via compressor air ducting) during certain portions of an aircraft flight, or some combination of ambient air and compressed air during certain portions of an aircraft flight. Because the compressor section 28 is driven electrically, the speed of the compressor section 28 can be varied as needed to achieve optimal efficiency or to achieve the desired power, considering the environmental conditions, ram effects, engine speed, etc.

The second electric generators 54B are in communication with the intermittent IC engine 22 and one or more electrical components; e.g., the battery 30, the first electric motor 56A, the second electric motor 56B, and/or the third electric motor 56C. Other electrically powered systems on the aircraft (not shown) such as electrically powered wheels or avionic systems, can also be connected to the network that connects the electrical components in system 20. The system 20 embodiment shown in FIG. 2 includes a pair of second electric generators 54B. The present disclosure system 20 may alternatively include a single second electric generator 54B or more than two second electric generators 54B. The second electric generators 54B are driven directly or indirectly by the intermittent IC engine 22. In some embodiments, a second electric generator 54B may be controllable to perform as an electric generator or as an electric motor. In those instances wherein a second electric generator 54B is controllable to perform as an electric motor, that second electric generator/motor can be used to provide power to the intermittent IC engine 22 to facilitating starting of the intermittent IC engine 22; e.g., power drawn from the battery(ies) 30 can be used to power the second electric generator/motor which in turn provides power to the intermittent IC engine 22 for starting purposes. In some embodiments, the batteries or generators of one system 20 can be used to start a second such propulsion system on the aircraft 21; e.g., a system configuration having a plurality of propulsion systems like those shown diagrammatically in FIGS. 2-5.

As described above, this system 20 embodiment includes an IC engine cooling system 38, a portion of which is disposed in the nacelle 25 of the aircraft 21. Coolant is used to as a heat transfer medium to remove thermal energy from the intermittent IC engine 22. Coolant piping 42 provides fluid communication between the intermittent IC engine 22 located in the fuselage 23 of the aircraft 21 and the portion of the IC engine cooling system 38 disposed within the nacelle 25 of the aircraft 21. The coolant exits the intermittent IC engine 22 and is selectively passed through the heat exchangers 40A, 40B. The heat exchangers 40A, 40B, in turn, transfer thermal energy from the coolant to air passing through the heat exchangers 40A, 40B. As stated above, some system embodiments include a plurality of cooling circuits. In these instances, the coolant is passed through the respective cooling circuits to accomplish the desired cooling. The resulting lower temperature coolant is subsequently passed back to the intermittent IC engine 22 to repeat the cycle. In some embodiments, the coolant piping may include piping or other structure disposed close to the surface of a structure (e.g., a strut 27) that connects the nacelle to the fuselage, to provide additional surface area that can be used to transfer heat from the coolant to the air while also preventing ice build-up on the structure. Coolant pumps can be either actively controllable by system controller 32, as shown in FIG. 2, to adjust flow and/or pressure as needed, or they can be uncontrolled. Coolant pumps may or may not be used in conjunction with other devices to regulate or limit pressure, such as pressure regulating valves and pressure limiting valves. Coolant pumps can be powered mechanically by connection to any rotating component (such as the intermittent IC engine, a generator, or a motor) or they can include their own electric motor. In some system embodiments, the IC engine cooling system 38 may be used to cool other system components (e.g., generators 54A, 54B, gearboxes, and the like).

Embodiments of the present disclosure system 20 may include a mechanical connection between the first electric generator 54A and the turbine section 26, and a mechanical connection between the second electric generators 54B and the intermittent IC engine 22. In either instance, the mechanical connection between the respective electric generator 54A, 54B and the power source driving the electric generator 54A, 54B (i.e., the turbine section 26 or the intermittent IC engine 22) may be configured for selective disengagement; e.g., via a clutch or other type connection. The selective disengagement may be used to control operation of the respective electric generator 54A, 54B during normal operation of the system 20 and/or may be used to selectively disengage the respective electric generator 54A, 54B in the event of a malfunction of the respective electric generator 54A, 54B. In similar fashion, the electric motors 56A, 56B or 56C may be configured for selective mechanical disengagement.

In some embodiments, system components such as electric motors 56A, 56B, 56C or electric generator 54A may include cooling features 55 (e.g., fins, etc.) that extend into the gas flow path 66 to provide cooling for the respective component. In some embodiments, some amount of air passing through the gas flow path 66 may be bled into the nacelle interior region 67 to facilitate cooling of components disposed within the nacelle interior region 67; e.g., to facilitate cooling of the electric motors 56B, 56C, or the generator 54A, or the turbine section 26, and the like. Air bled into the nacelle interior region 67 may also be used for ventilation purposes. In some embodiments, the air bled from the gas flow path 66 can be directed to pass around components disposed within the nacelle interior region 67 and then exit into part of the gas flow path having a lower static pressure than point at which the air was bled from the gas flow path (i.e. the bleed inlet). The exit can be located at a position in the gas flow path that is downstream of the bleed inlet, or it could exit at an annulus formed between the exhaust pipe or muffler and the first airflow containing structure 68, such that a flow of air is created in the nacelle interior region 67.

Figure 3:
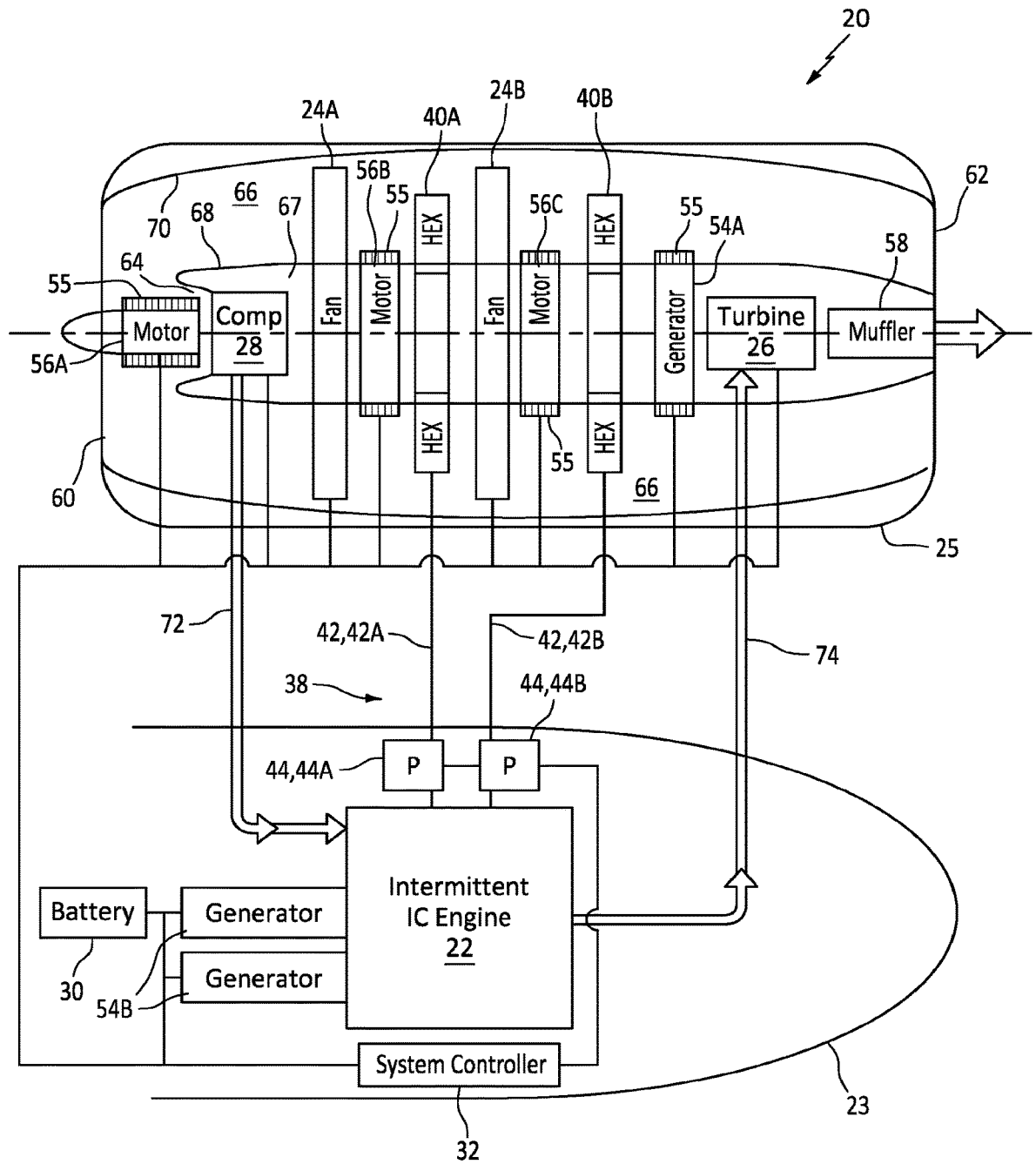
FIG. 3 is a diagrammatic illustration of a hybrid aircraft propulsion system according to an embodiment of the present disclosure.

FIG. 3 illustrates an alternative present disclosure aircraft propulsion system 20 configuration. In this configuration, the first heat exchanger 40A is disposed between the first fan 24A and the second fan 40B, and the second heat exchanger 40B is disposed aft of the second fan 40B.

Figure 4:
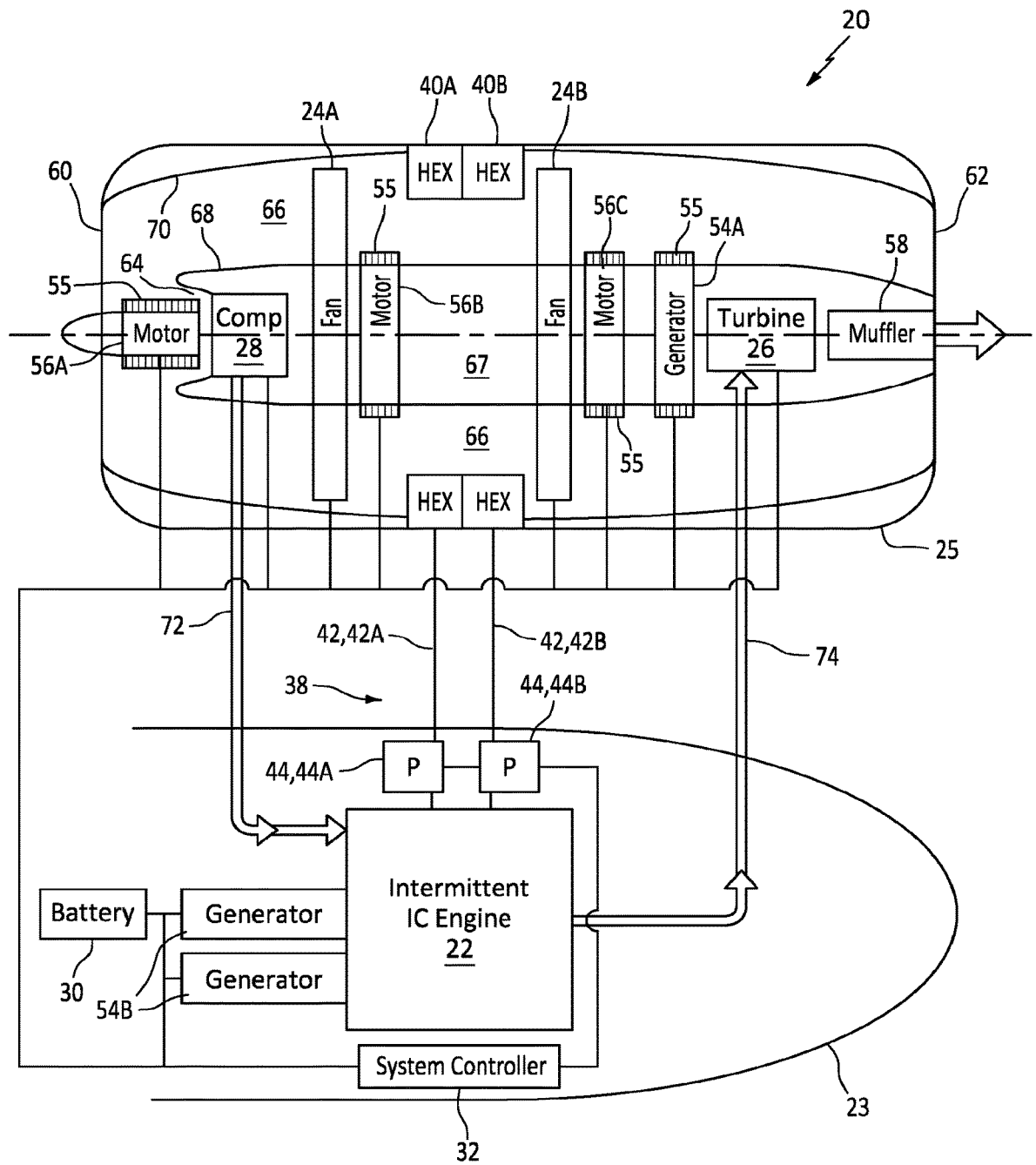
FIG. 4 is a diagrammatic illustration of a hybrid aircraft propulsion system according to an embodiment of the present disclosure.

FIG. 4 illustrates another alternative present disclosure aircraft propulsion system 20 configuration. In this embodiment, the first and second heat exchangers 40A, 40B are disposed radially outwardly within the outer gas flow path 66. The first and/or second heat exchanger 40A, 40B may extend circumferentially around a portion or all of the outer radial circumference of the gas flow path 66. The first or second heat exchanger 40A, 40B may include one or more cooling circuits. In FIG. 4, the first and second heat exchangers 40A, 40B are shown axially adjacent one another. In alternative embodiments, the first and second heat exchangers 40A, 40B may be spaced axially apart from one another; e.g., in a configuration similar to that shown in FIG. 3, the first heat exchanger 40A may be disposed axially between the first fan 24A and the second fan 24B, and the second heat exchanger 40B may be disposed aft of the second fan 24B. In some embodiments, portions of all of the first and second heat exchangers 40A, 40B may be circumferentially misaligned; e.g., the first heat exchanger may extend circumferentially in a first circumferential half of the gas flow path 66, and the other of the first and second heat exchangers 40A, 40B may extend circumferentially in the opposite circumferential half of the gas flow path. 66, or sections of the first and second heat exchangers 40A, 40B may be alternately disposed around the circumference of the gas flow path 66 to facilitate uniform heat transfer. The present disclosure is not limited to any particular configuration of the first and second heat exchangers 40A, 40B.

Figure 5:
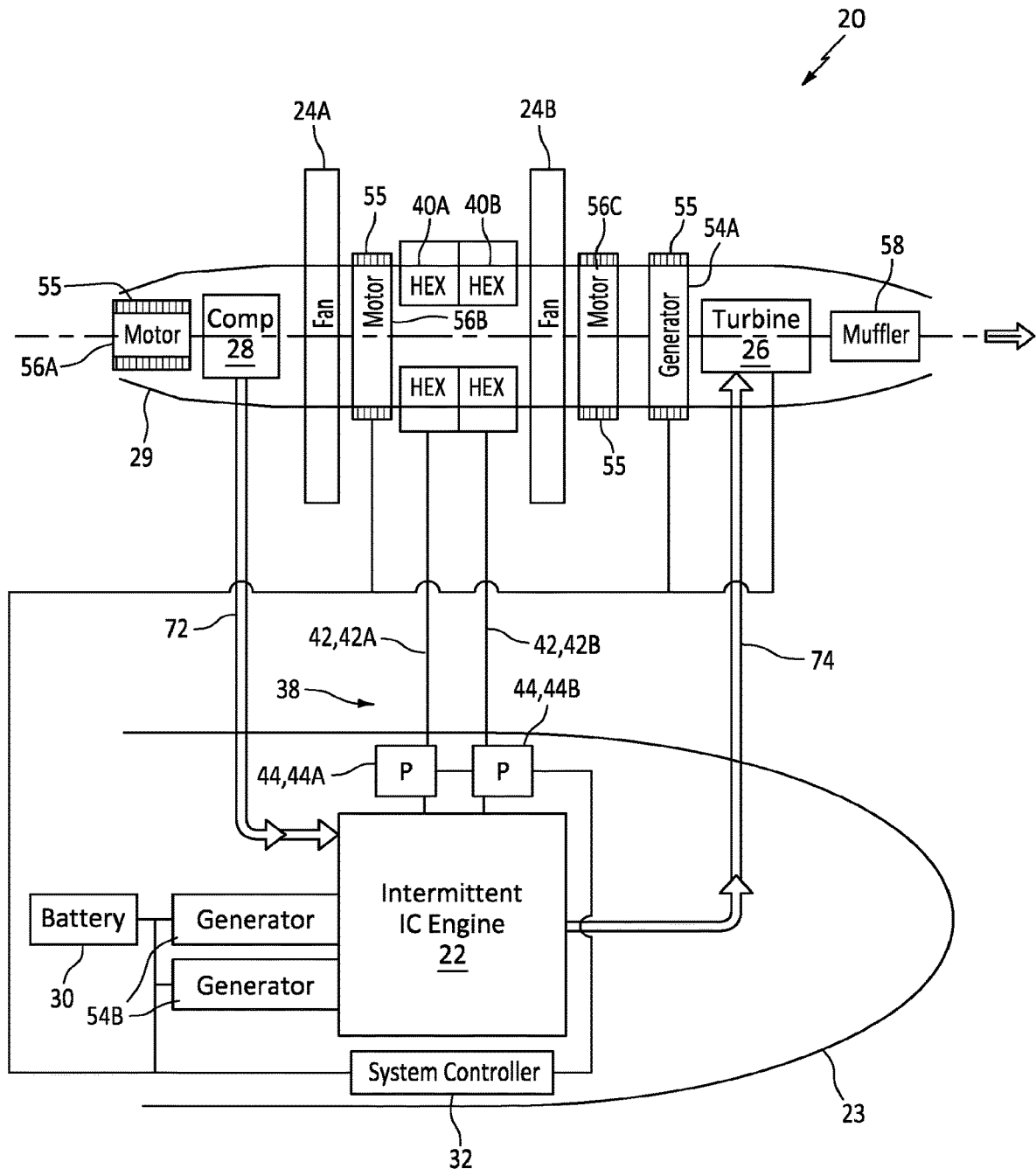
FIG. 5 is a diagrammatic illustration of a hybrid aircraft propulsion system according to an embodiment of the present disclosure.

Referring to FIG. 5, some embodiments of the aircraft propulsion system 20 may be utilized with a pylon type structure 29 rather than a nacelle type structure. FIG. 5 shows an example of such a structure wherein a first electric motor 56A, a compressor section 28, a first fan 24A, a second electric motor 56B, an IC engine cooling system 38, a second fan 24B, a third electric motor 56C, a first electric generator 54A, a turbine section 26, and an exhaust gas device 58 are disposed in a pylon structure 29. The fan blades 50 of the first and second fans 24A, 24B extend outwardly from the pylon structure 29 and are therefore disposed in open air. As indicated above, the present disclosure is not limited to a propulsion system 20 that includes two fans; e.g., a system 20 embodiment that utilizes a pylon structure 29 may utilize a single fan and electric motor for driving the same. In some embodiments, propellers may be used instead of fans.

In the operation of the present disclosure system embodiments shown in FIGS. 2-4, the intermittent IC engine 22 may be started at the beginning of an aircraft flight (e.g., a flight of the aircraft 21 from point A to point B at selected altitudes and velocities) using a conventional starter powered by the battery 30 or, as described above, by the battery 30 and a second electric generator 54B controlled to perform as an electric motor. When the intermittent IC engine 22 is operating, air is drawn into the intake of the engine 22, mixed with fuel, combusted, and exhaust gases are produced. The produced exhaust gases may be directed to the turbine section 26 or may be bypassed around the turbine section 26 for portions of the aircraft flight; e.g., if the electrical power requirements are such that the first electric generator 54A is not required to produce electrical energy, or if a failure occurs in the generator 54A such that continued rotation is not desirable.

During operation, the system may be controlled to cause the intermittent IC engine 22 to drive the second electric generators 54B to produce electrical power for the system 20 and the system may be controlled to cause the turbine section 26 to drive the first electric generator 54A to produce electrical power for the system 20. The electrical power contribution from each respective electric generator 54A, 54B can be controlled throughout the aircraft flight to provide the requisite electrical power for driving the compressor section 28, fans 24A, 24B, for charging the batteries 30, and to satisfy whatever other electrical power requirements the aircraft 21 may have. Throughout an aircraft flight the aforesaid electrical power contribution from each respective electric generator 54A, 54B may be varied to achieve desirable performance/efficiency.

Rotation of the first and second fans 24A, 24B result in ambient air being drawn through the nacelle 25, including the gas flow path 66. When the aircraft 21 is stationary or moving at slow speeds on the ground, the fans 24A, 24B provide the primary means for drawing air through the nacelle 25. When the aircraft 21 is flying, the velocity of the aircraft 21 provides an additional means for passing air through the nacelle 25. The forward end of the first airflow confining structure 68 may be configured, as shown in FIG. 2, to form a compressor inlet duct 64 to direct ambient air into the compressor section 28. Ambient air captured by the compressor inlet duct 64 can produce a ram-air effect for air entering the inner gas flow path 64. This is particularly true when the aircraft 21 is flying.

During system 20 operation, the first electric motor 56A may be selectively operated to drive the compressor section 28 during portions of an aircraft flight wherein it is advantageous to provide compressed air to the intermittent IC engine 22. In an aircraft flight phase wherein there is minimal or no advantage to providing compressed air to the intermittent IC engine 22, the compressor section 28 may not be powered, thereby avoiding the need to provide electrical energy to the first electric motor 56A. The rotational speed of the compressor 28 is selectable by varying the speed setting or torque setting of the electric motor 56A, as determined by the system controllers or engine controllers, to achieve the required power and/or desirable efficiency, depending on conditions such as and not limited to atmospheric pressure, engine rotational speed, ram effects, engine power, etc.

As stated above, during system 20 operation exhaust gases produced by the intermittent IC engine 22 may be directed to the turbine section 26 or may be bypassed around the turbine section 26 for portions of the aircraft flight. In those instances where the exhaust gases produced by the intermittent IC engine 22 are directed to the turbine section 26, the exhaust gases power the turbine section 26 and the turbine section 26 (mechanically connected to the first generator 54A) in turn powers the first electric generator 54A. Exhaust gases exiting the turbine section 26 are passed to the exhaust gas device 58.

Rotation of the first and second fans 24A, 24B produce the propulsive force (e.g., thrust) necessary to power the aircraft 21. A portion of the propulsive force is attributable to air forced through the gas flow path 66 by the fans 24A, 24B and a portion of the propulsive force may be attributable to exhaust gases exiting the exhaust gas device 58. The amount of propulsive force produced by the first and second fans 24A, 24B can be selectively controlled by varying the speed setting or torque setting of the motors 56B, 56C, to satisfy the requirements of the various portions of the aircraft flight; e.g., propulsive force required for takeoff, propulsive force required for low altitude flight at lower aircraft velocities, propulsive force required for high altitude flight at high aircraft velocities (e.g., cruise), propulsive force required for landing, and the like. The speeds of the fans 24A and 24B may be different, for example fan 24B may rotate at higher speed than fan 24A or vice versa. As stated above, the fans 24A, 24B may have the same configuration or may have different configurations, and airflow directing structures (e.g., guide vanes) configured to desirably direct airflow into and/or away from a fan may be used with one or both fans 24A, 24B. In other embodiments fans 24A and 24B may be designed to rotate in opposite directions, which may reduce or avoid the need for the aforementioned airflow directing structures for reduced system weight and cost. As stated above, exhaust gases exiting the turbine section 26 and subsequently passed to the exhaust gas device 58 may produce some amount of propulsive force during various portions of an aircraft flight.

Figure 6:
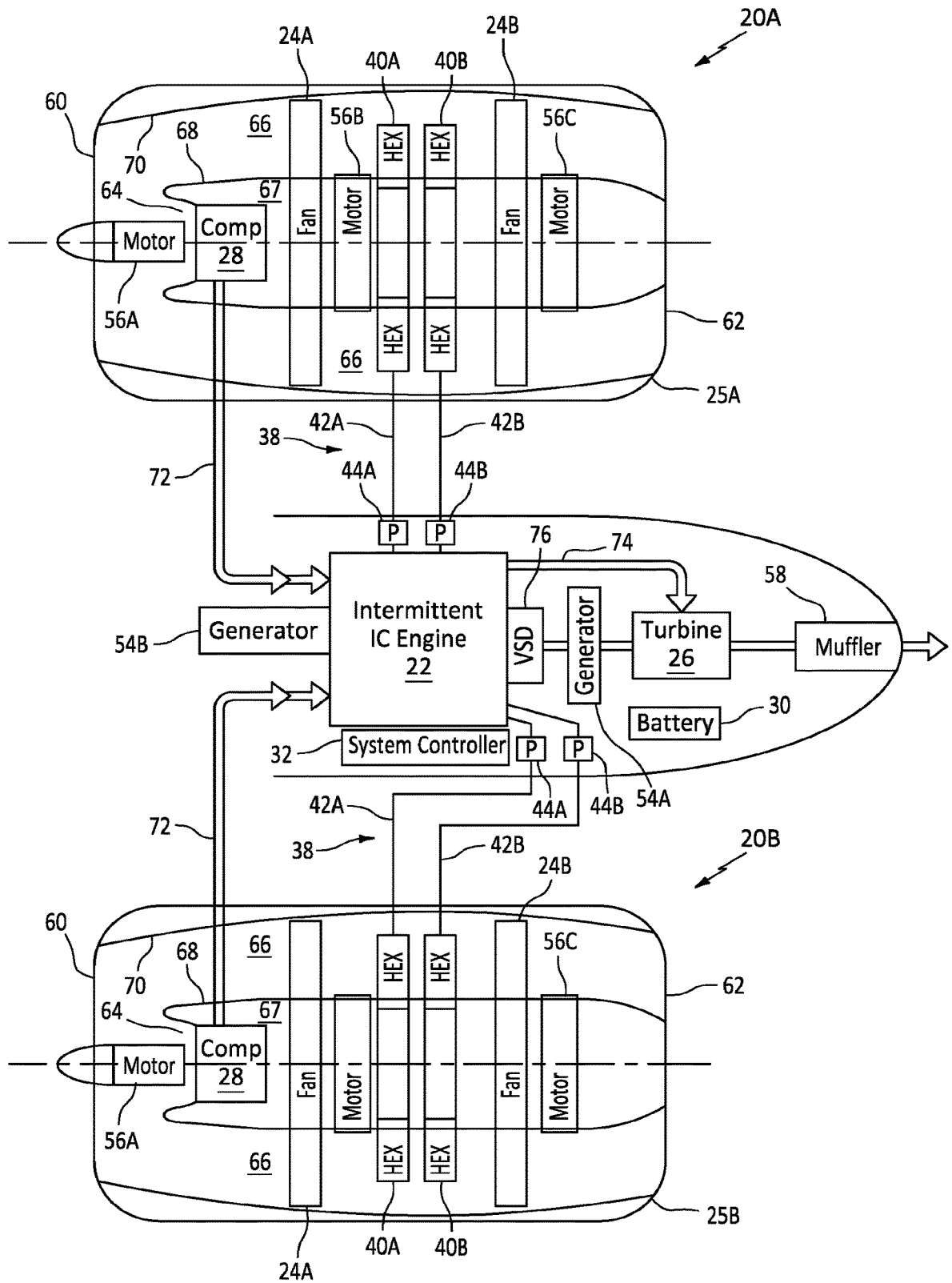
FIG. 6 is a diagrammatic illustration of a hybrid aircraft propulsion system according to an embodiment of the present disclosure.

FIG. 6 diagrammatically illustrates another exemplary embodiment of a present disclosure aircraft propulsion system 20 that includes a plurality of aircraft propulsion systems 20 and a shared intermittent IC engine 22 and a turbine section 26 disposed in a fuselage 23 of the aircraft 21. It should be noted that the aircraft propulsion systems described above and shown in FIGS. 2-5 may be used in a configuration wherein a plurality of aircraft propulsion systems are utilized; e.g., with each aircraft propulsion system having a first generator 54A and a turbine section 26 in contrast with the system configuration shown in FIG. 6 wherein the first generator 54A and a turbine section 26 are shared between a pair of aircraft propulsion systems. The utilization of a first generator 54A and a turbine section 26 in each aircraft propulsion system can provide a desirable redundancy in the event of an issue with one of the first generators 54A. In such a system configuration, one of the second electric generators 54B may be dedicated to one of the aircraft propulsion systems, and the other second electric generator 54B may be dedicated to the other aircraft propulsion system. Here again, redundancy is provided and in the event of an issue with one of the second electric generators 54B, the remaining second electric generator may be controlled to provide electrical power to both aircraft propulsion systems. In similar fashion, a plurality of batteries 30 can be provided for redundancy.

In the system embodiment shown in FIG. 6, the present disclosure system 20 includes a plurality of aircraft propulsion systems 20 (e.g., first aircraft propulsion system 20A disposed in a first nacelle 25A, a second propulsion system 20B disposed in a second nacelle 25B), and a shared intermittent IC engine 22 and a turbine section 26 disposed in a fuselage 23 of the aircraft 21. Embodiments of the present disclosure having a plurality of aircraft propulsion systems (e.g., 20A, 20B) and a shared intermittent IC engine 22 and turbine section 26 are not limited to locating the aircraft propulsion systems in nacelles and locating the shared intermittent IC engine 22 and turbine section 26 in a fuselage 23.

The first and second aircraft propulsion systems 20A, 20B may each include a compressor section 28, a first electric motor 56A, a first fan 24A, a second electric motor 56B, a pair of heat exchangers 40A, 40B, a second fan 24B, and a third electric motor 56C. These components are the same or similar to those components described in the systems 20 described above. The component configuration of one of the aircraft propulsion systems 20A, 20B may be the same as the component configuration of the other aircraft propulsion systems 20A, 20B, or the component configuration of the aircraft propulsion systems may differ from one another.

In the system embodiment shown in FIG. 6, the first and second aircraft propulsion systems 20A, 20B include the heat exchangers 40A, 40B configured in the manner described and shown in FIG. 2. As indicated above, the heat exchanger configuration shown in FIG. 2 is a nonlimiting example of how heat exchangers may be utilized within the present system including the system embodiment shown in FIG. 6. The aircraft propulsion systems 20 in a present disclosure system embodiment having a plurality of aircraft propulsion systems 20 may use any of the heat exchanger configurations described herein, and each of the plurality of aircraft propulsion systems 20 may use the same heat exchanger configuration, or different aircraft propulsion systems 20 may use different heat exchanger configurations.

In a system embodiment 20 like that shown in FIG. 6 with a shared intermittent IC engine 22 and a turbine section 26, compressed air from the compressor section 28 of the first aircraft propulsion system 20A, or compressed air from the compressor section 28 of the second aircraft propulsion system 20B, or both, may be provided to the intermittent IC engine 22 via compressor air ducting 72. Exhaust from the intermittent IC engine 22 may be provided to the turbine section 26 via exhaust gas ducting 74. As described above, the turbine section 26 may then be used to power a first electric generator 54A. Electrical power generated by the first electric generator 54A may be provided to the first aircraft propulsion system 20A, or to the second aircraft propulsion system 20B, or to both. As stated above, the first electric generator 54A may be a single generator system with a single winding set or it may include a plurality of independent winding sets, and the first electric generator 54A may integrally include electrical power management controls, or electrical power management controls may be disposed separately from the first electric generator 54A, to permit management of the electrical power produced by the generator to the system. In some embodiments, first electric generator 54A can be cooled using a coolant circuit that includes its own pump and a heat exchanger that may be mounted in propulsion system 20A and/or 20B.

In some system 20 embodiments, such as that shown in FIG. 6, the turbine section 26 may also be mechanically coupled to the intermittent IC engine 22 via a variable speed drive, or a continuously variable transmission, or a gear box, or the like (collectively referred to hereinafter as a "VSD 76") that can accommodate rotational velocity differences between the turbine section 26 and the intermittent IC engine 22; e.g., operational turbine rotational speeds typically exceed operational rotational speeds of an intermittent IC engine 22. By enabling a difference in the rotational speeds of the turbine section 26 and the intermittent IC engine 22, the turbine section 26 may be controlled to operate at a rotational speed desirable for turbine section 26 operation and the intermittent IC engine 22 may be controlled to operate at a rotational speed desirable for operation of the intermittent IC engine 22. The VSD 76 permits both the intermittent IC engine 22 and the turbine section 26 to provide motive force to the first electric generator 54A, while each operates at a respective desirable rotational speed. Selective control of the VSD 76 may be performed using stored instructions executable by the system controller 32. Generator 54A may be connected to the shaft of the turbine, or it may be connected to the intermittent IC engine 22 or it may be connected to the gearbox VSD 76 such that generator 54A is turned by a gear rotating at a different speed than the turbine or intermittent IC engine.

Referring to FIGS. 1-6, embodiments of the present disclosure system 20 may be configured to control system components (e.g., electric generators 54A, 54B, electric motors 56A, 56B, 56C, intermittent IC engine 22, etc.) based on aircraft flight requirements. Instructions stored within the system controller 32 for example, when executed, cause the system controller 32 to control the function of system components (e.g., electric generators 54A, 54B, electric motors 56A, 56B, 56C, intermittent IC engine 22, etc.) to achieve the aircraft flight requirements.

One or more of the present disclosure system 20 embodiments described herein may be configured to permit a fan 24A, 24B to rotate at different rotational velocities to produce varying amounts of thrust; e.g., a relatively large operating band that permits low thrust operations and high thrust operations, for example, at high speed, high altitude cruise. As stated above, intermittent IC engines typically have a relatively narrow operating band as compared to a gas turbine engine. Hence, the ability of present disclosure system 20 embodiments to control the rotational velocities of a fan 24A, 24B (the rotational velocities of fans 24A, 24B may be controlled independently of one another) and the rotational velocity of the intermittent IC engine 22 and the rotational velocity of the turbine enables the fans 24A, 24B to operate at rotational speeds desirable for the fans independent of one another, the intermittent IC engine 22 may be controlled to operate at rotational speeds desirable for operation of the intermittent IC engine 22 and the generator 54A can be controlled to operate the turbine section 26 at rotational speeds desirable for best efficiency of the turbine and generator system while respecting speed limits. More specifically, the present disclosure systems 20 permit continual adjustment of generator excitation (for wound field generators) or generator torque setting or rpm setting (for permanent magnet generators) to keep the turbine section 26 in a desirable speed range to maximize the overall efficiency of the turbine section 26 and generator system and to ensure that respective rotational speed limitations are respected.

A person skilled in the art will recognize from the above that the present disclosure system 20 provides several significant advantages. As stated above, an intermittent IC engine (e.g., a turbo-compounded or turbocharged rotary engine) may be difficult to implement in a high-altitude, high-speed aircraft with podded engines, such as a business jet because of the relatively large volume engine coolant heat exchangers required and the associated relatively large frontal areas of intermittent IC engines. The aforesaid relatively large heat exchangers and associated relatively large frontal areas of such an engine are difficult to fit in a podded engine nacelle and can produce considerable drag in a highspeed aircraft applications. Embodiments of the present disclosure system 20 provide an attractive solution that avoids these issues; e.g., by disposing an intermittent IC engine 22 within an aircraft fuselage 23, by using electrically powered fans to produce propulsive force, and by satisfying the cooling requirements of the intermittent IC engine 22 without the need for relatively large heat exchangers and associated relatively large frontal areas.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An aircraft propulsion system for an aircraft having a nacelle and a fuselage, the nacelle having a pylon structure that defines a pylon interior region, the system comprising:
    a compressor section powered by a first electric motor, the compressor section configured to be disposed in the pylon interior region and to receive air entering the pylon interior region, and configured to selectively produce a flow of compressor air at an air pressure greater than an ambient air pressure;
    an intermittent internal combustion (IC) engine configured to selectively intake the flow of compressor air during operation and produce an exhaust gas flow during operation;
    a turbine section in communication with and configured to power a first electric generator configured to produce electrical power, wherein the turbine section is powered by the exhaust gas flow;
    a first fan rotationally driven by a second electric motor about a first rotational axis, the first fan having a first hub centered on the first rotational axis and a plurality of first fan blades extending radially outward from the first hub, wherein the first hub is configured to be disposed in the pylon interior region and the plurality of first fan blades are configured to extend outside of the pylon structure, wherein the first fan is positioned downstream of the compressor section; and
    an IC engine cooling system having at least one heat exchanger and at least one pump configured to provide coolant communication between the intermittent IC engine and the at least one heat exchanger, the at least one heat exchanger disposed in communication with an exterior of the pylon structure.

2. The aircraft propulsion system of claim 1, wherein the first electric motor is configured to have an adjustable rotational speed and/or an adjustable torque setting, and a rotational speed of the compressor section is controllable by adjusting at least one of the rotational speed of the first electric motor or the torque setting of the first electric motor.

3. The aircraft propulsion system of claim 1, further comprising a second fan rotationally driven by a third electric motor about a second rotational axis, the second fan having a second hub centered on the second rotational axis and a plurality of second fan blades extending radially outward from the second hub, wherein the second hub is configured to be disposed in the pylon interior region and the plurality of second fan blades are configured to extend outside of the pylon structure.

4. The aircraft propulsion system of claim 3, wherein the second electric motor is controllable to vary a rotational speed of the first fan and the third electric motor is controllable to vary a rotational speed of the second fan.

5. The aircraft propulsion system of claim 3, wherein electrical power produced by the first electric generator is used to power at least one of the first electric motor, the second electric motor, or the third electric motor.

6. The aircraft propulsion system of claim 3, further comprising at least one second electric generator configured to be driven by the intermittent IC engine and at least one battery configured to store electrical energy, wherein electrical power produced by the at least one second electric generator is used to power at least one of the first electric motor, the second electric motor, or the third electric motor.

7. The aircraft propulsion system of claim 1, wherein the intermittent IC engine is configured to be disposed in the fuselage of the aircraft, and the IC engine cooling system has a coolant piping that is configured to provide fluid communication of a coolant between the intermittent IC engine and the at least one heat exchanger.

8. The aircraft propulsion system of claim 1, wherein the at least one heat exchanger of the IC engine cooling system is configured to receive ambient air from the exterior of the pylon structure.

9. An aircraft propulsion system for an aircraft having a nacelle and a fuselage, the nacelle having a gas flow path and a nacelle interior region disposed radially inside of the gas flow path, the system comprising:
    a compressor section powered by a first electric motor, the compressor section configured to be disposed in the nacelle interior region and to receive air entering the nacelle, and configured to selectively produce a flow of compressor air at an air pressure greater than an ambient air pressure;
    an intermittent internal combustion (IC) engine configured to selectively intake the flow of compressor air during operation and produce an exhaust gas flow during operation;
    a turbine section in communication with and configured to power a first electric generator configured to produce electrical power, wherein the turbine section is powered by the exhaust gas flow;
    a first fan rotationally driven by a second electric motor about a first rotational axis, the first fan having a first hub centered on the first rotational axis and a plurality of first fan blades extending radially outward from the first hub, wherein the first hub is configured to be disposed in the nacelle interior region and the plurality of first fan blades are configured to extend into the gas flow path, wherein the first fan is positioned downstream of the compressor section; and
    an IC engine cooling system having at least one heat exchanger and at least one pump configured to provide coolant communication between the intermittent IC engine and the at least one heat exchanger, the at least one heat exchanger disposed in communication with the gas flow path of the nacelle.

10. The aircraft propulsion system of claim 9, wherein the first electric motor is configured to have an adjustable rotational speed and/or an adjustable torque setting, and a rotational speed of the compressor section is controllable by adjusting at least one of the rotational speed of the first electric motor or the torque setting of the first electric motor.

11. The aircraft propulsion system of claim 9, further comprising a second fan rotationally driven by a third electric motor about a second rotational axis, the second fan having a second hub centered on the second rotational axis and a plurality of second fan blades extending radially outward from the second hub, wherein the second hub is configured to be disposed in the nacelle interior region and the plurality of second fan blades are configured to extend into the gas flow path.

12. The aircraft propulsion system of claim 11, wherein the second electric motor is controllable to vary a rotational speed of the first fan and the third electric motor is controllable to vary a rotational speed of the second fan.

13. The aircraft propulsion system of claim 11, wherein electrical power produced by the first electric generator is used to power at least one of the first electric motor, the second electric motor, or the third electric motor.

14. The aircraft propulsion system of claim 11, further comprising at least one second electric generator configured to be driven by the intermittent IC engine and at least one battery configured to store electrical energy, wherein electrical power produced by the at least one second electric generator is used to power at least one of the first electric motor, the second electric motor, or the third electric motor.

15. The aircraft propulsion system of claim 9, wherein the intermittent IC engine is configured to be disposed in the fuselage of the aircraft, and the IC engine cooling system includes coolant piping that is configured to provide fluid communication of a coolant between the intermittent IC engine and the at least one heat exchanger.

16. The aircraft propulsion system of claim 9, wherein the at least one heat exchanger of the IC engine cooling system is disposed to be in communication with the gas flow path adjacent an airflow confining structure.

17. The aircraft propulsion system of claim 9, wherein the at least one heat exchanger is configured to extend a circumferential distance within the gas flow path.

18. A method of powering an aircraft having a fuselage and a nacelle, the nacelle defining an annular gas flow path and having a nacelle interior region disposed radially inside of the gas flow path, the method comprising:
  driving a compressor section using a first electric motor to selectively produce a flow of compressor air at an air pressure greater than an ambient air pressure, the compressor section disposed within the nacelle interior region and disposed to receive air entering the at least one nacelle;
  operating an intermittent internal combustion (IC) engine using the flow of compressor air, the IC engine operated to drive at least one first electric generator to produce electrical power and to produce an exhaust gas flow during operation, wherein the intermittent IC engine and the at least one first electric generator are disposed in the fuselage;
  operating a turbine section to drive a second electric generator to produce electrical power, the turbine section powered using the exhaust gas flow;
  rotationally driving at least one fan about a rotational axis using a second electric motor powered by electrical power produced by the at least one first electrical generator, or the second electrical generator, or both, to force ambient air through the gas flow path, the fan having a first hub centered on the rotational axis and a plurality of fan blades extending radially outward from the hub, and the plurality of first fan blades extending into the gas flow path, wherein the first fan is positioned downstream of the compressor section; and
  pumping a volume of coolant through a cooling system having at least one heat exchanger and a pump, the IC engine cooling system configured to provide coolant communication between the intermittent IC engine and the at least one heat exchanger, the at least one heat exchanger disposed in communication with the gas flow path of the at least one nacelle.

* * * * *